US012610230B2

(12) United States Patent
    Wifvesson

(10) Patent No.: US 12,610,230 B2
(45) Date of Patent: Apr. 21, 2026

(54) KEY MANAGEMENT FOR UE-TO-NETWORK RELAY ACCESS

(71) Applicant: Telefonaktiebolaget LM Ericsson (publ), Stockholm (SE)

(72) Inventor: Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 18/030,032

(22) PCT Filed: Oct. 4, 2021

(86) PCT No.: PCT/IB2021/059096
    § 371 (c)(1),
    (2) Date: Apr. 3, 2023

(87) PCT Pub. No.: WO2022/070170
    PCT Pub. Date: Apr. 7, 2022

(65) Prior Publication Data
    US 2023/0370839 A1      Nov. 16, 2023

Related U.S. Application Data

(60) Provisional application No. 63/086,693, filed on Oct. 2, 2020.

(51) Int. Cl.
    *H04W 12/04*        (2021.01)
    *H04W 8/00*         (2009.01)
    (Continued)

(52) U.S. Cl.
    CPC ........... *H04W 12/04* (2013.01); *H04W 8/005* (2013.01); *H04W 88/04* (2013.01); *H04W 92/18* (2013.01)

(58) Field of Classification Search
    CPC ..... H04W 12/04; H04W 8/005; H04W 88/04; H04W 92/18
    (Continued)

(56) References Cited

U.S. PATENT DOCUMENTS 10,462,681 B2 *  10/2019  Guha ................... H04W 24/08
2016/0295574 A1 *  10/2016  Papasakellariou .... H04L 1/0009
    (Continued)

FOREIGN PATENT DOCUMENTS

| WO | 2022069959 A1 | 4/2022 | |
| WO | WO-2022071866 A1 * | 4/2022 | ............ H04W 40/22 |
| WO | WO-2022175538 A1 * | 8/2022 | .......... H04W 12/037 |

OTHER PUBLICATIONS

3GPP TS 33.303 v16.0.0(Jul. 2020) pp. 1-90 (Year: 2020).*
    (Continued)

*Primary Examiner* — Tauqir Hussain
(74) *Attorney, Agent, or Firm* — Sage Patent Group

(57)                ABSTRACT

A method of operating a user equipment, UE, (1000) in a wireless communication system is provided. The method includes obtaining (502) a discovery key for discovery of a UE-to-Network relay from a first application function. The method includes using (504) the discovery key for discovery of the UE-to-Network relay over a PC5 interface. A method of operating a user equipment-to-network, UE-to-NW, relay node in a wireless communication system is also provided. The method includes obtaining (702) a discovery key for discovery of a user equipment, UE, from a first application function. The method includes using (704) the discovery key for discovery of the UE over a PC5 interface.

39 Claims, 15 Drawing Sheets

(51) Int. Cl.
  *H04W 88/04* (2009.01)
  *H04W 92/18* (2009.01)

(58) Field of Classification Search
  USPC ......................................................... 713/171
  See application file for complete search history.

(56) References Cited

U.S. PATENT DOCUMENTS

| | | | | |
|---|---|---|---|---|
| 2017/0055149 A1* | 2/2017 | Lehtovirta | ........ | H04W 12/0431 |
| 2018/0295527 A1* | 10/2018 | Guha | .................... | H04W 24/08 |
| 2018/0302889 A1* | 10/2018 | Guo | .................... | H04B 17/309 |
| 2019/0239147 A1* | 8/2019 | Chun | .................... | H04W 88/06 |
| 2019/0394816 A1* | 12/2019 | Kim | .................... | H04W 76/10 |
| 2020/0100088 A1* | 3/2020 | Kim | .................... | H04W 48/16 |
| 2020/0163049 A1* | 5/2020 | Lau | .................... | H04W 68/02 |
| 2020/0213858 A1* | 7/2020 | Yi | .................... | H04W 8/26 |
| 2021/0345104 A1* | 11/2021 | Cheng | .................... | H04W 12/0433 |
| 2021/0368581 A1* | 11/2021 | Shan | .................... | H04W 8/24 |
| 2025/0016560 A1* | 1/2025 | Kim | .................... | H04W 12/0431 |

OTHER PUBLICATIONS

3GPP TR 23.752 V0.4.0, "3rd Generation Partnership Project; Technical Specification Group Services and System Aspects; Study on system enhancement for Proximity based Services (ProSe) in the 5G System (5GS) (Release 17)", 3GPP TR 23.752 V0.4.0, Jun. 2020.

3GPP TS 23.401, V,16.8.0 , "3rd Generation Partnership Project; Technical Specification Group Services and System Aspects; General Packet Radio Service (GPRS) enhancements for Evolved Universal Terrestrial Radio Access Network (E-UTRAN) access (Release 16)", Sep. 2020.

3GPP TS 23.501 V16.6.0 "3rd Generation Partnership Project, Technical Specification Group Services and System Aspects;System architecture for the 5G System (5GS)";Stage 2 (Release 16), Sep. 2020.

3GPP TS 24.334 V16.0.0, "3rd Generation Partnership Project; Technical Specification Group Core Network and Terminals; Proximity-services (ProSe) User Equipment (UE) to ProSe function protocol aspects; Stage 3 (Release 16)", 3GPP TS 24.334 V16.0.0, Jul. 2020.

3GPP TS 33.220 V16.2.0, "3rd Generation Partnership Project; Technical Specification Group Services and System Aspects; Generic Authentication Architecture (GAA); Generic Bootstrapping Architecture (GBA)(Release 16)" 3GPP TS 33.220 V16.2.0, Sep. 2020.

3GPP TS 33.303 V16.0.0, "3rd Generation Partnership Project; Technical Specification Group Services and System Aspects; Proximity-based Services (ProSe); Security aspects (Release 16)", Jul. 2020, 3GPP TS 33.303 V16.0.0, Jul. 2020.

3GPP TS 33.501 V16.4.0, "3rd Generation Partnership Project; Technical Specification Group Services and System Aspects; Security architecture and procedures for 5G system (Release 16)", 3GPP TS 33.501 V16.4.0, Sep. 2020.

3GPP TS 33.535 V16.1.0, "3rd Generation Partnership Project; Technical Specification Group Services and System Aspects; Authentication and Key Management for Applications (AKMA) based on 3GPP credentials in the 5G System (5GS) (Release 16)", 3GPP TS 33.535 V16.1.0, Sep. 2020.

3GPP TS 36.523-1 V16.6.0, "3rd Generation Partnership Project: Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 16)", 3GPP TS 36.523-1 V16.6.0, Oct. 2020.

* cited by examiner

OBTAINING AN ADDRESS OF THE FIRST APPLICATION FUNCTION AND/OR THE
SECOND APPLICATION FUNCTION FROM AN ACCESS AND MOBILITY FUNCTION
IN A CORE NETWORK OF THE
WIRELESS COMMUNICATION SYSTEM
602

Figure 6A

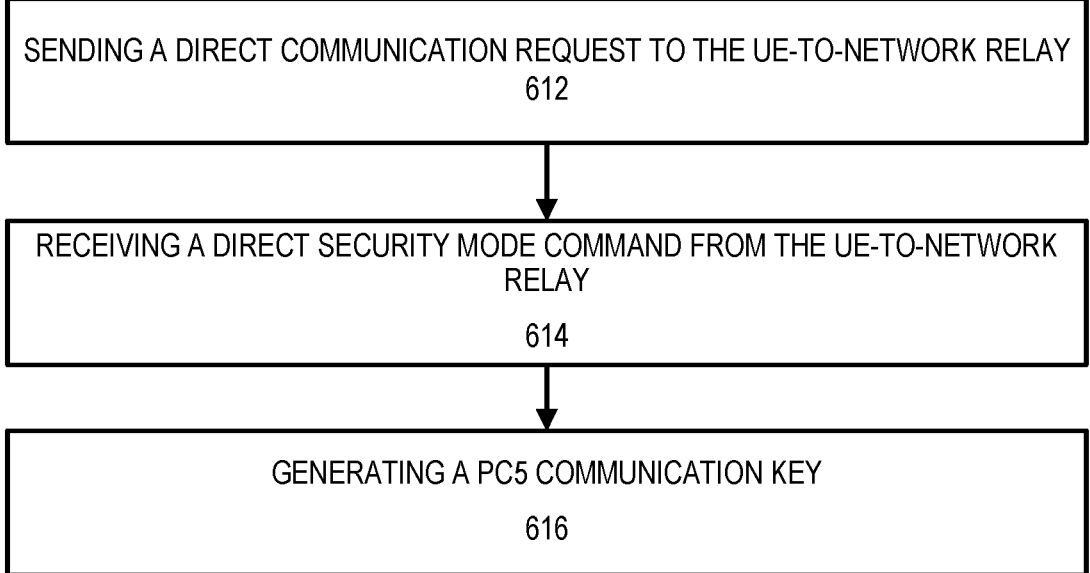

SENDING A DIRECT COMMUNICATION REQUEST TO THE UE-TO-NETWORK RELAY
612

RECEIVING A DIRECT SECURITY MODE COMMAND FROM THE UE-TO-NETWORK
RELAY
614

GENERATING A PC5 COMMUNICATION KEY
616

Figure 13:
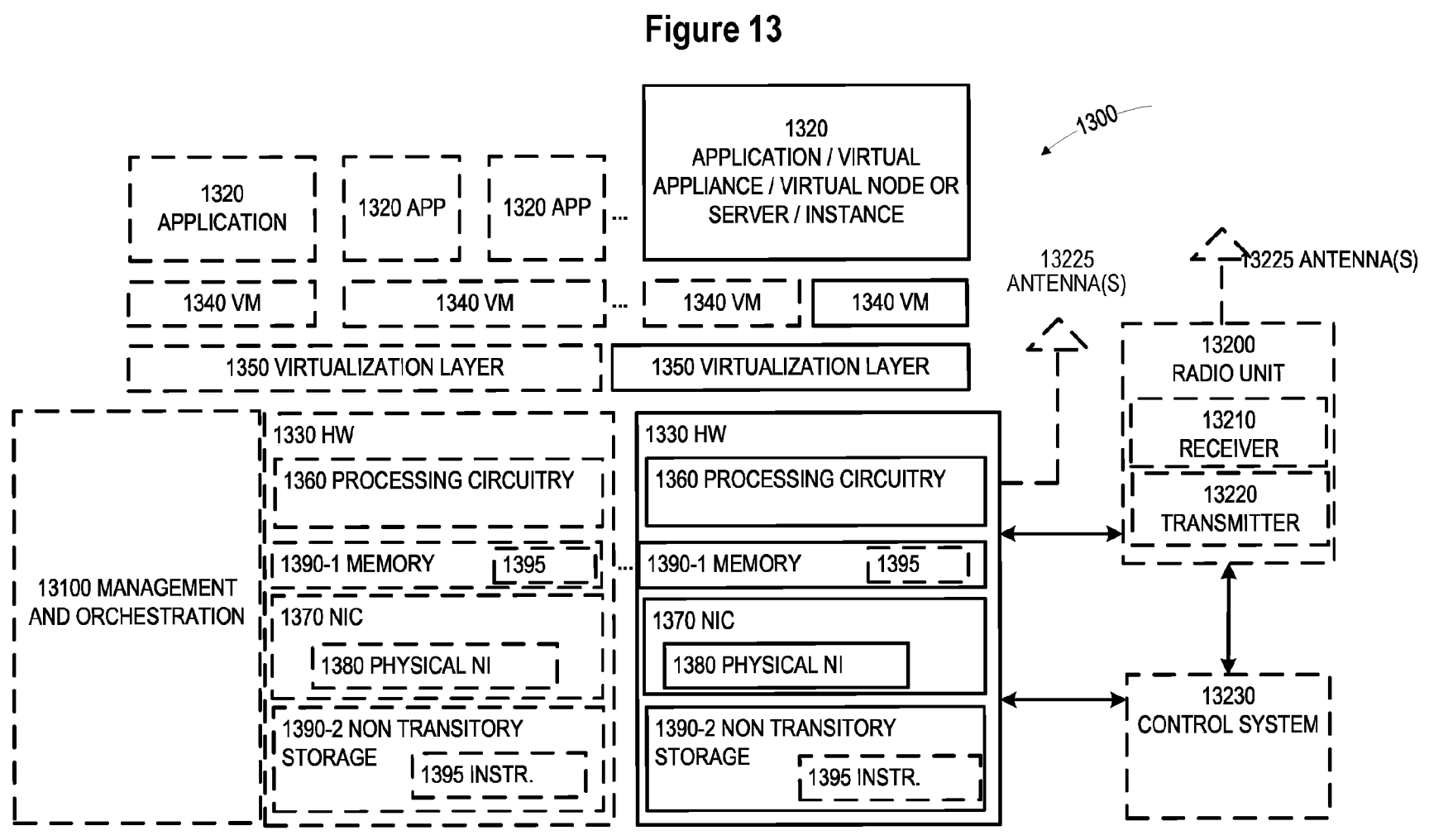

13225 ANTENNA(S)

13200 RADIO UNIT

13210 RECEIVER

13220 TRANSMITTER

13230 CONTROL SYSTEM

13225 ANTENNA(S)

1320 APPLICATION / VIRTUAL APPLIANCE / VIRTUAL NODE OR SERVER / INSTANCE

1340 VM

1350 VIRTUALIZATION LAYER

1330 HW

1360 PROCESSING CIRCUITRY 1390-1 MEMORY

1395

1370 NIC

1380 PHYSICAL NI 1390-2 NON TRANSITORY STORAGE

1395 INSTR.

1320 APP

1320 APP

1340 VM

1350 VIRTUALIZATION LAYER

1330 HW

1360 PROCESSING CIRCUITRY 1390-1 MEMORY

1395

1370 NIC

1380 PHYSICAL NI 1390-2 NON TRANSITORY STORAGE

1395 INSTR.

1320 APPLICATION

1340 VM

13100 MANAGEMENT AND ORCHESTRATION

KEY MANAGEMENT FOR
UE-TO-NETWORK RELAY ACCESS

RELATED APPLICATIONS

This application is a national stage application of International Patent Application No. PCT/IB2021/059096, filed Oct. 4, 2021, which claims priority to U.S. Patent Application No. 63/086,693, filed Oct. 2, 2020, the disclosure disclosures of which are hereby incorporated in their entirety by reference.

TECHNICAL FIELD

Inventive concepts described herein relate to communication networks, and in particular to communication networks including ProSe functionality.

BACKGROUND

Proximity Services, or ProSe, is a Device-to-Device (D2D) technology that allows long term evolution (LTE) devices to detect each other and to communicate directly. ProSe uses a sidelink air interface for direct connectivity between devices. Acting as a UE-to-Network relay, a user equipment (UE) can provide wireless network connectivity to other UEs (called remote UEs) that are experiencing coverage problems. The UE-to-Network relay extends network coverage by relaying internet protocol (IP) traffic between the network and remote UEs. The relay communicates with remote UEs using UE-to-UE direct communication protocols while connecting to the network using existing non-D2D protocols.

After deployment of a ProSe-enabled UE in 4G systems, the configuration parameters stored in the UICC or in the UE may need to be updated to reflect the changes in the configuration applied.

When configuration data of a ProSe-enabled UE are stored in the UICC, the UICC OTA mechanism (as specified in ETSI TS 102 225/102 226 and 3GPP TS 31.115/31.116/]) is used to secure the transfer of the configuration data to be updated in the universal integrated circuit card (UICC). When the configuration parameters are stored in the UE, a PSK-TLS tunnel needs to be established between the ProSe function (referred to as the network function) and the UE.

For UE-initiated messages, the procedures specified by clause 5.4 of 3GPP TS 23.501 are used with the following addition. The network function may optionally include an indication in the PSK-identity hint in the ServerKeyExchange message over the Ua interface to inform the UE of the FQDN of the BSF with which the UE will run the bootstrapping procedure over the Ub interface as specified in 3GPP TS 33.303 to provide the key material for establishment of the TLS tunnel. When performing such bootstrapping with the indicated BSF, the UE and BSF use the provided FQDN as the BSF Identity in all places, e.g. forming the B-TID. If there is no such indication, the UE performs the bootstrapping with the BSF at the address given in 3GPP TS 23.003.

The UE may also hold a B-TID, Ks and other associated material from bootstrapping runs with different binding support functions (BSFs) simultaneously.

A network function that implements network application function (NAF) functionality requests user security settings (USSs) from the BSF when requesting the Ks_(ext/int) _NAF key. The network function checks in the USS if the universal subscribed identity module (USIM) is authorized to be used for ProSe services.

If a PSK TLS connection has been established as a part of a pull message and is still available, the available PSK transport layer security (TLS) session is used.

If a TLS connection is released, it can only be re-established by the client, i.e. the UE, even though the TLS session including security association would be alive on both sides. The TLS connection, in turn, is dependent on the underlying transmission control protocol (TCP) connection.

UE-to-Network Relay in 4G

The ProSe UE-to-Network relay procedures in 4G consist of two distinct phases, i.e., the discovery of the UE-to-Network relay (discovery phase) and the communication between the remote UE and the UE-to-Network relay (communication phase).

The security of the discovery messages uses the procedures provided in the current specification in 3GPP TS 33.303. The security of the communication between the remote UE and UE-to-Network relay uses the procedures described in clause 6.5 in 3GPP TS 33.303 to establish the security context and protect the actual communication. The part of the security establishment that is specific to the UE-to-Network relay use case is the establishment of the shared key $K_D$. The procedures for this operation are described in FIG. 1 and in 3GPP TS 33.303.

Following the general sequence of flows for public safety one to one communication, a shared key $K_D$ needs to be established. This key is used to derive session keys between the remote UE and the UE-to-Network relay.

In order to generate the shared key $K_D$, the remote UE needs to obtain a ProSe Relay User Key (PRUK) and an associated 64-bit PRUK identifier (ID) from a ProSe key management function (PKMF). The PRUK ID is used to identify the PRUK to the PKMF of the UE-to-Network relay. The PRUK can be used to generate $K_D$ for any of the relays under a particular PKMF and hence only one PRUK is needed from a particular PKMF for each remote UE. The PRUK needs to be fetched by the remote UE while the remote UE is still within network coverage. This implies that the remote UE must contact all the PKMFs of any potential relays it wants to be able to use.

The remote UE may fetch the PRUK from the PKMF using the Key Request/Response messages or it may receive the PRUK through generic bootstrapping architecture push (GBA PUSH) as part of establishing the communication with the relay. The UE-to-Network relay fetches the $K_D$ that will be used to secure the communication by sending to its PKMF the PRUK ID (or international mobile subscriber identity (IMSI) if the remote UE does not have a PRUK for the relay or if the supplied PRUK has been rejected). At the PKMF side, the corresponding PRUK is retrieved. The $K_D$ is then derived from the PRUK using a $K_D$ Freshness Parameter (a locally generated random number), which the PKMF then passes to the remote UE via the UE-to-Network Relay, a nonce sent by the remote UE via the UE-to-Network Relay, and the Relay Service Code the remote UE wishes to access. The UE-to-Network Relay receives the $K_D$ and the $K_D$ Freshness Parameter, and stores the $K_D$. Having the $K_D$ Freshness Parameter enables the remote UE to derive the same $K_D$ as the PKMF did.

If the remote UE receives a new PRUK in a Key Response message, it deletes any previous one for that PKMF. If it receives a new PRUK through a GBA PUSH message, it overwrites any PRUK received through a GBA PUSH message that has not been successfully used to establish a relay connection. Once a PRUK received through a GBA PUSH Message has been used to calculate a $K_D$ for a successful relay connection establishment, the remote UE deletes any previous PRUKs for that PKMF.

ProSe in 5G Systems

In 3GPP TR 23.752, the SA2 body is studying an architecture option named 'User Plane Based Architecture'. This architecture proposes to adopt necessary functions of ProSe Function as defined in 3GPP TS 23.303 into the 5G system architecture. According to 3GPP TS 23.303, the Direct Discovery Name Management Function (DDNMF) and the Direct Provisioning Function (DPF) of ProSe Function are necessary to support ProSe in 5G system architecture. DPF is used to provision the UE with necessary parameters in order use 5G ProSe Direct Discovery and 5G Prose Direct Communication, which can be replaced by PCF. DDNMF is used to provide following procedures over PC3 interface:

Discovery Request/Response Procedure: to provide IDs and filter for direct discovery.

Match Report Procedure: to check direct discovery and provide mapping information for direct discovery.

Announcing Alert Procedure: Support 'On-demand' ProSe Direct Discovery in case of ProSe restricted discovery model A.

Discovery Update Procedure: to update/revoke a previously allocated IDs, filters.

5GS supports Service-Based Architecture, and DDNMF can be the network function (NF) that is not only able to interact with 5G NFs (e.g., to consume Nudm service operation) but is also able to connect with the UE via user plane connectivity for support procedures over the PC3 interface. In the architecture, it is proposed to introduce 5G DDNMF as shown in FIG. 2. In 5G, the DDNMF is managed by the mobile network operator (MNO), and is able to consume service operation from other network functions (NFs) in 5GC (e.g., Nudm or Npcf).

The PC3 interface supports Discovery Request/Response, Match Report Procedure, Announcing Alert Procedure, and Discovery Update Procedure as following baseline features defined in 3GPP TS 23.303. Which network slice selection assistance information (NSSAI) or DNN to be used for user plane connectivity for PC3 interface is up to the configuration of the MNO (e.g., It can be controlled by the UE route selection policy (URSP) or a local configuration in the UE).

SUMMARY

According to some embodiments of inventive concepts, a method of operating a user equipment (UE) in a wireless communication system includes obtaining a discovery key for discovery of a UE-to-Network relay from a first application function. The method includes using the discovery key for discovery of the UE-to-Network relay over a PC5 interface.

User equipment and computer program and computer program products having analogous operations are also provided.

According to other embodiments of inventive concepts, a method of operating a user-equipment-to-network (UE-NW) relay node in a wireless communication system includes obtaining a discovery key for discovery of a user equipment (UE) from a first application function. The method includes using the discovery key for discovery of the UE over a PC5 interface.

User-equipment-to-network relay nodes and computer program and computer program products having analogous operations are also provided.

BRIEF DESCRIPTION OF THE DRAWINGS

FIGS. 5A, 5B, 6A, 6B, 7 and 8 illustrate example operations according to some embodiments.

FIG. 13 is a block diagram of a virtualization environment in accordance with some embodiments.

DETAILED DESCRIPTION

Figure 1:
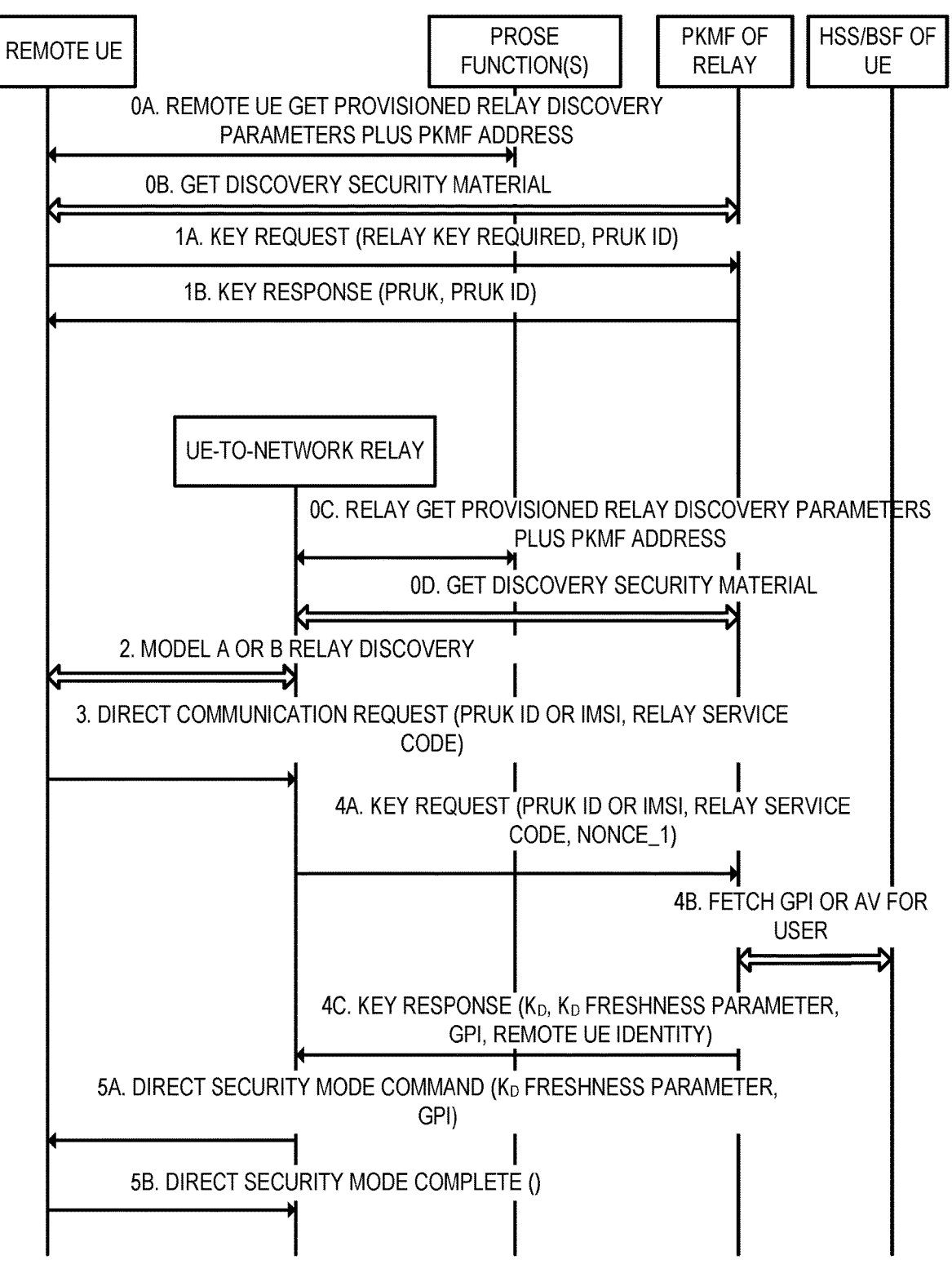
FIG. 1 illustrates conventional operations for managing keys for supporting ProSe functionality in a wireless communication system.
Figure 2:
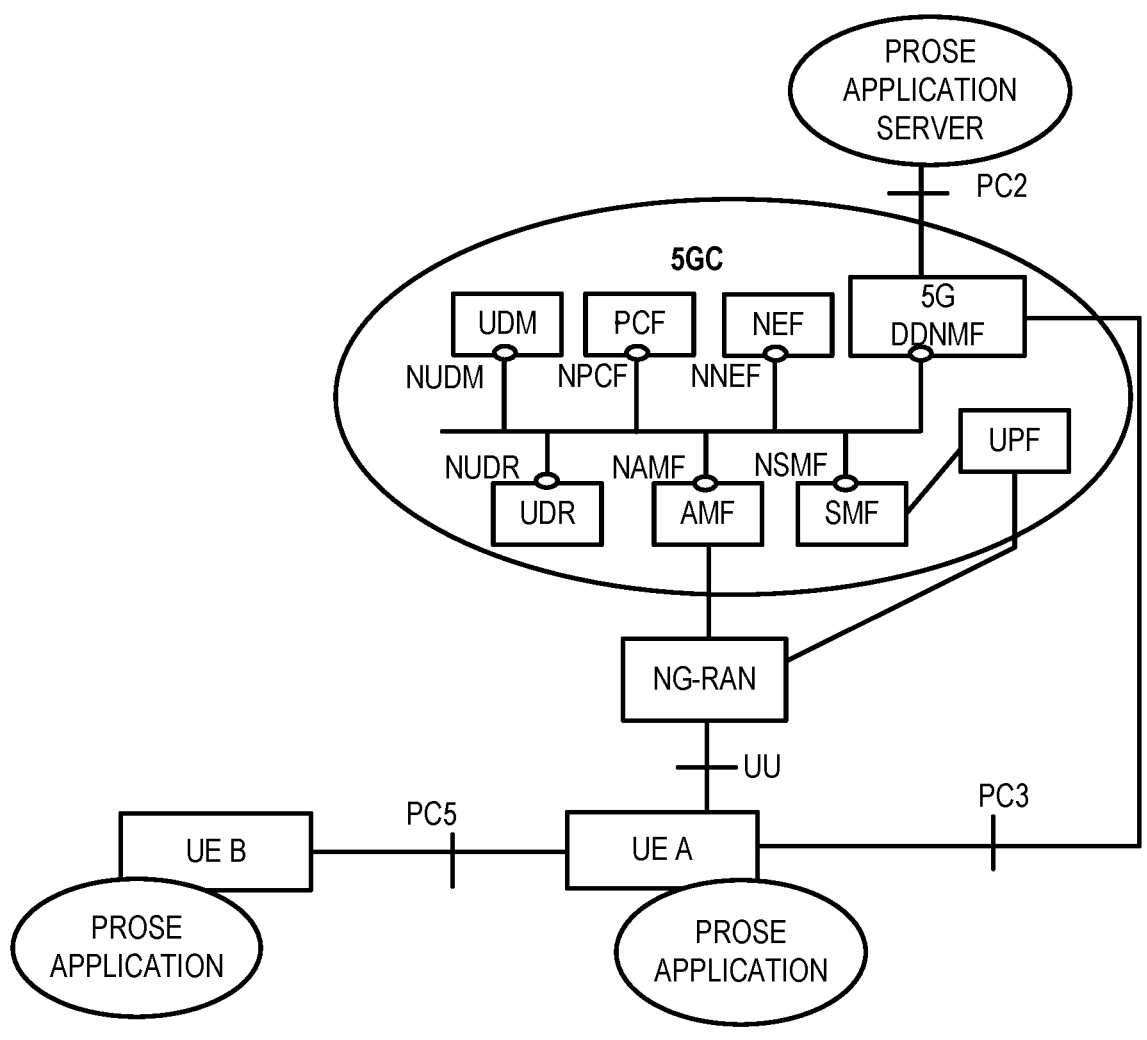
FIG. 2 illustrates elements of a communication system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In 4G (evolved packet system (EPS)), the use case of UE-to-Network Relay was for public safety only. However, in 5GS, UE-to-Network Relay applies to both public safety and commercial use cases, and thus security and authentication procedures are needed. In 5GS, it is not described how the UE retrieves the security keys used for discovery of a UE-to-Network Relay over a PC5 interface or how the UE retrieves the security keys used for communication with a UE-to-Network Relay over a PC5 interface.

Once a UE has obtained an address to an application function (AF) for ProSe services, the UE can access the application function (AF) for discovery of a UE-to-Network Relay. An AF used for ProSe key management for UEs and UE-to-NW Relays can provide a discovery key to the UE and to the UE-to-Network Relay to be used by the UE for discovery of a UE-to-Network Relay or by a UE-to-Network Relay to discover a UE over a PC5 interface.

Similarly, once a UE has obtained an address to an AF for ProSe key management services for PC5 communication with a UE-to-Network Relay from the network, the AF can provide a security key (e.g., PC5-comm key) to the UE to be used for establishing further security keys with the UE-to-Network Relay for communication with the UE-to-Network Relay over a PC5 interface.

The AF that provides the discovery key (AF-1) and the AF that provides the security key (AF-2) may be the same AF, different AFs, or different parts of the same AF. That is, AF-1 and AF-2 can be a combined AF, or AF-1 and AF-2 can be two different AFs. Secure connections may be established between the UE and the AF-1, and between the UE and the AF-2.

Accordingly, in some embodiments described herein, an AF used for ProSe key management for discovery by the UE's and the UE-to-NW Relays (AF-1), can provide discovery keys to the UE and the UE-to-Network Relay to be used by UE for discovery of a UE-to-Network Relay or by a UE-to-Network Relay to discover a UE over PC5 interface. Likewise, in some embodiments, an AF used for ProSe key management for PC5 communication by the UEs and the UE-to-NW Relays (AF-2), can provide security keys (e.g., a PC5-comm key) to the UE and the UE-to-Network Relay to be used by the UE and the UE-to-Network Relay to establish further security keys for PC5 communication between the UE and the UE-to-Network Relay.

In some embodiments, the 5G DDNMF or some other application function used for ProSe services can take the role as the AF-1 or AF-2 or the combined AF (AF-1+AF-2). Alternatively, a new application function may be defined for key management in ProSe services. If the 5G DDNMF is used as the application function, then in the 5G DDNMF may be a separate entity and not a part of the PCF.

The Remote UE obtains from the network an address to an AF-1 (application function) used for ProSe services for discovery of a UE-to-Network Relay. This AF-1 is used for ProSe key management for Remote UEs and UE-to-Network Relays, and can provide Discovery key(s) to the Remote UE and to the UE-to-Network Relay to be used by a Remote UE for discovery of a UE-to-Network Relay or by a UE-to-Network Relay to discover a Remote UE over a PC5 interface.

The Remote UE also obtains from the network an address to an AF-2 (application function) used for ProSe key management services as PC5 communication with a UE-to-Network Relay over a PC5 interface. The AF-2 provides a security key (e.g., PC5-comm key) to the Remote UE and the UE-to-Network Relay to be used for establishing further security keys between the UE and the UE-to-Network Relay, to be used for PC5 interface communication.

Figure 3:
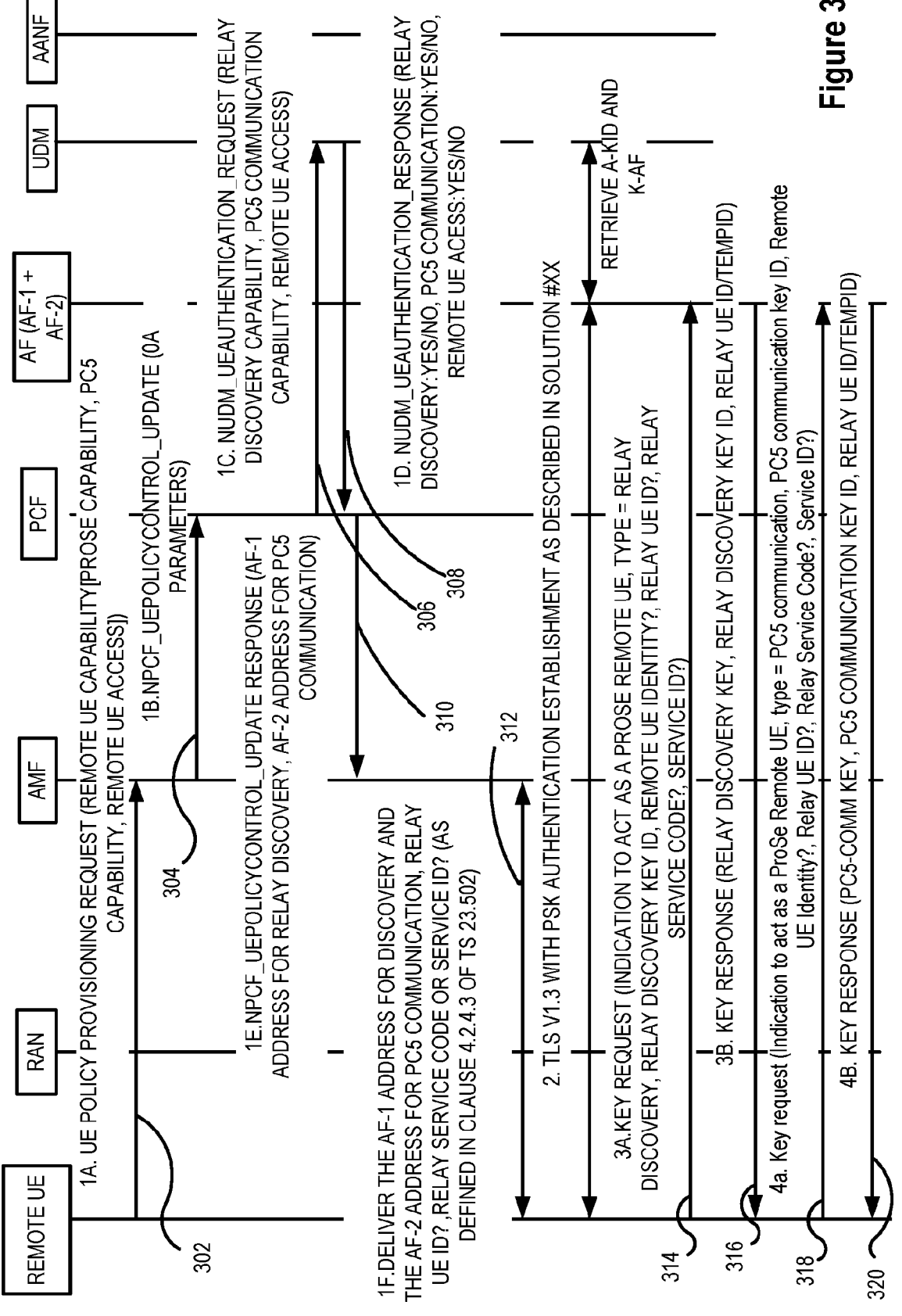
FIGS. 3 and 4 illustrate operations for managing keys for supporting ProSe functionality in a wireless communication system according to some embodiments.

FIG. 3 illustrates operations for obtaining a discovery key and a security key by a remote UE according to some embodiments. In particular, in operation 1a, when the Remote UE wants to use ProSe services and discover a UE-to-network relay, it registers and provides its UE capabilities to support ProSe services as UE-to-Network Relay discovery and PC5 communication with a ProSe UE-to-network Relay and the UE also indicates the UE indication that it wants to act as a Remote UE, to the network. This is accomplished by sending a UE policy provisioning request 302 to the access and mobility function (AMF) including a Remote UE capability indication containing the UE's ProSe capability and PC5 capability along with an indication of Remote UE access.

In operation 1b, the AMF sends a policy control update request 304 over a service-based interface to discover the corresponding PCF and requests for the policy required for ProSe UE Discovery.

In particular, the AMF sends an Npcf UEpolicycontrol_update request over the service-based interface to discover the corresponding PCF. The AMF also requests the AF-1 address required for ProSe Relay discovery and the AF-2 address required for ProSe PC5 communication with a ProSe UE-to-network Relay. The AMF forwards the UE capabilities to support both ProSe services as UE-to-Network Relay discovery and PC5 communication with a ProSe UE-to-network Relay and the UE indication to act as a Remote UE, to the PCF.

In operation 1c, the PCF checks with the unified data management (UDM) to determine whether the UE is allowed to use ProSe services such as UE-to-Network Relay discovery and PC5 communication with a ProSe UE-to-network Relay and if the UE is allowed to act as a Remote UE. The policy and charging function (PCF) provides the UDM with the subscriber concealed identifier (SUCI) or 5G-GUTI (globally unique temporary identifier) of the UE and the UE's capabilities to support both UE-to-Network Relay discovery and PC5 communication with a ProSe UE-to-network Relay, and indicates the UE intention to act as a Remote UE to the UDM in a Nudm_UEAuthentication_request 306.

The UDM maintains an indicator in the UE subscription that indicates whether the UE is allowed to use UE-to-Network Relay discovery and PC5 communication with a ProSe UE-to-network Relay and whether the is allowed to act as a Remote UE or not.

In operation 1d, the UDM responds back to the PCF with the SUPI of the UE and an indication of whether the UE is allowed to use UE-to-Network Relay discovery and PC5 communication with a ProSe UE-to-network Relay. The UDM also provides an indication of whether the UE is allowed to act as a Remote UE. These indications may be included in an Nudm_UEAuthentication_response 308.

Upon receipt of the response from the UDM, the PCF can determine whether the UE is allowed to use UE-to-Network Relay discovery and PC5 communication with a ProSe UE-to-network Relay, and whether the UE is allowed to act as a Remote UE as per PLMN policy.

In operation 1e, if the UE is allowed to use UE-to-Network Relay discovery and PC5 communication with a ProSe UE-to-network Relay and it is allowed to act as a Remote UE, then the PCF returns the AF-1 server address for the key management server used for discovery of a UE-to-network Relay and the AF-2 server address for the key management server used for PC5 communication with a UE-to-network relay, together with an indication that the UE is allowed to act as a Remote UE in a UE policy control update response 310. As noted above, the functionality of AF-1 and AF-2 may be implemented in a single AF. The PCF may also provide the Relay UE ID, the Relay Service Code and/or or Service ID to the AMF.

In operation 1f, the AMF forwards the information received from the PCF in operation 1e to the UE in a provisioning response 312. In particular, the AMF delivers the AF-1 address for discovery and/or the AF-2 address for PC5 communication to the UE. The AMF may optionally provide the Relay UE ID, the Relay Service Code and/or the Service ID to the UE.

In operation 2, the Remote UE establishes a secure connection with the AF (AF-1+AF-2) server.

In operation 3a, the Remote UE sends a first key request message 314 for discovery of a UE-to-Network relay to the AF-1. The key request message includes an indication to the AF that the key request is for discovery of a UE-to-network relay. The key request message includes an indication that it wants to act as a Remote UE, a type indication (e.g., type=relay discovery), and a Relay Discovery key ID. The Key request message may optionally include the Remote UE Identity, Relay UE ID, Relay Service Code, and/or Service ID.

In operation 3b, the AF-1 provides a Relay Discovery key, Relay Discovery key ID, and Relay UE ID/TempID to the UE to be used for UE-to-network relay discovery, in a first key response message 316.

In operation 4a, the Remote UE sends a second key request message 318 for PC5 communication with a UE-to-network relay to the AF-2. The Remote UE includes an indication to the AF-2 that the key request is for PC5 communication with a UE-to-network relay. The Remote UE includes an indication that it wants to act as a Remote UE, type=PC5 communication, and a PC5 communication key ID. The key request message may optionally include one or more of a Remote UE Identity, Relay UE ID, Relay Service Code, and/or Service ID.

In operation 4b, the AF-2 provides a PC5 communication key (e.g., PC5-comm key), a PC5 communication key ID, and a Relay UE ID/TempID to the Remote UE to be used for PC5 communication with a UE-to-network relay discovery, in a second key response message 320.

Figure 4:
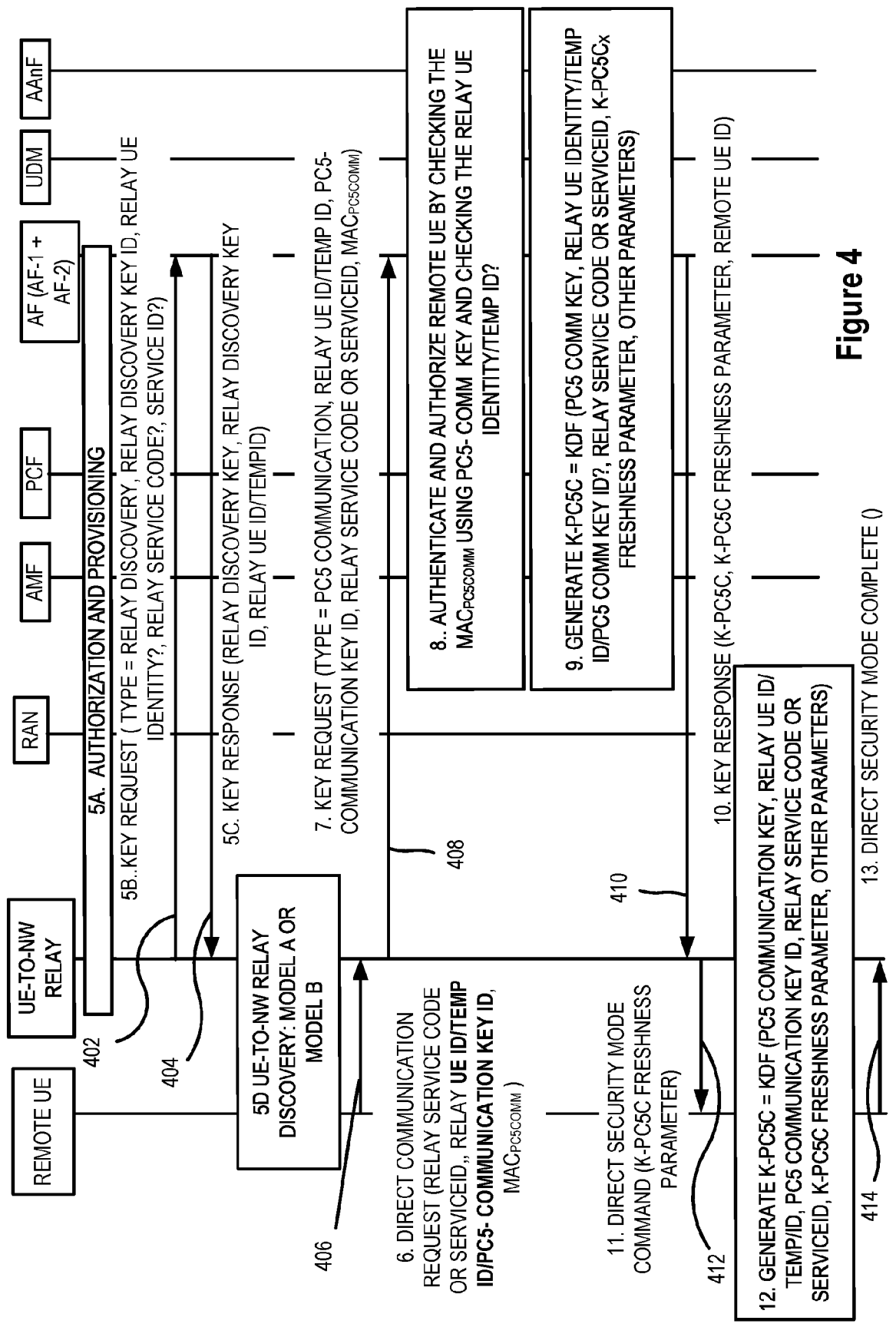

Further operations are illustrated in FIG. 4. As shown therein, in operation 5a, the UE-to-network relay gets authenticated and authorized by the network to act as a UE-to-network relay.

In operation 5b, the UE-to-network relay sends a first key request message 402 for discovery of a remote UE to the AF-1.

The UE-to-network relay includes the following parameters in the key request message 402: an indication that it wants to act as a UE-to-network relay, type=relay discovery, and a Relay Discovery key ID. The first key request message 402 may optionally include a Relay UE ID, a Relay Service Code, and/or a Service ID.

In operation 5c, the AF provides a Relay Discovery key together with a relay Discovery key ID and a Relay UE ID/Temp ID to the UE-to-network relay to be used for UE-to-network relay discovery, in a first key response message 404.

In operation 5d, the Remote UE discovers the UE-to-network Relay using either model A or model B discovery.

In operation 6, the Remote UE sends a Direct Communication Request 406 to the UE-to-Network relay. The Remote UE includes the PC5 communication key ID received from the AF-2 together with a Relay Service Code or Service ID, a Remote UE ID, a Relay UE ID or a Temporary ID. The PC5 communication key ID indicates the PC5 communication key which the Remote UE want to use to obtain relay connectivity. The Direct Communication Request contains the Relay Service Code or Service ID that the Remote UE would like to access. The Remote UE generates a freshness parameter (Nonce-1) and includes the Nonce-1 freshness parameter in the Direct Communication Request message. The Remote UE calculates a MAC-PC5COMM over the included ProSe parameters using the PC5 communication key and includes the MAC-PC5COMM in the Direct Communication Request 406.

In operation 7, the UE-to-network relay sends a second key request message 408 for PC5 communication with a Remote UE to the AF-2 and forwards one or more of the parameters received from the Remote UE in operation 6, including the PC5 communication key ID, the Relay UE ID or Temp ID, the Remote UE ID, the Relay Service Code or Service ID, the MAC-PC5COMM and the freshness parameter Nonce-1.

The UE-to-network relay includes the following parameters in the second key request message 408: type=PC5 communication, PC5 communication key ID, Remote UE ID, Relay UE ID, MAC-PC5COMM and Nonce-1. The second key request message 408 may optionally include a Temp ID, a Relay Service Code or Service ID. The AF-2 identifies the Remote UE by the PC5 communication key ID.

In operation 8, the AF-2 authenticates and authorize the Remote UE by verifying the MAC-PC5COMM using the PC5 communication key identified by the PC5 communication key ID and the received freshness parameter, Nonce-1. The AF-2 verifies the Relay UE ID or the Temporary ID. The AF-2 checks the context of the Remote UE to confirm whether it can connect to the network via the selected ProSe UE-to-network Relay for the given Relay Service Code or Service ID.

In operation 9, if the AF-2 confirms the Remote UE can connect to the network via the selected ProSe UE-to-network Relay, the AF-2 generates a new freshness parameter (i.e. a K-PC5C freshness parameter). The AF-2 generates a new key K-PC5C from the PC5 communication key, the PC5 communication key ID, Remote UE ID, Relay UE ID or the Temporary ID, Relay Service Code or Service ID, Nonce-1 and the new freshness parameter (i.e., the KPC5C freshness parameter).

The K-PC5C is calculated as K-PC5C=KDF (PC5 communication key, PC5 communication key ID, Remote UE ID, Relay UE Identity or Temp ID, Relay Service Code or ServiceID, Nonce-1, a freshness parameter (K-PC5C freshness), or other parameters), where KDF(●) is a key derivation function.

In operation 10, the AF-2 sends the Remote UE Identity, K-PC5C, freshness parameter (K-PC5C freshness) to the UE-to-network relay in a second key response message 410.

In operation 11, using the supplied K-PC5C to protect the Direct Security Mode Command message, the UE-to-network relay sends a Direct Security Mode Command message 412 to the Remote UE. This message shall contain the K-PC5C freshness. The Remote UE calculates a MAC-PC5COMM over the included ProSe parameters using the PC5 communication key and a newly generated freshness parameter (Nonce-2), and includes the MAC-PC5COMM and the newly generated freshness parameter (Nonce-2) in the Direct Security Mode Command message 412.

In operation 12, the Remote UE derives K-PC5C key from its PC5 communication key, PC5 communication key ID, Remote UE ID, Relay UE Identity or Temp ID, Nonce-1, the received K-PC5C freshness, and the Relay Service Code or service ID.

The K-PC5C key is calculated as K-PC5C=KDF (PC5 communication key, PC5 communication key ID, Remote UE ID, Relay UE Identity or Temp ID, Relay Service Code or ServiceID, Nonce-1, a freshness parameter (K-PC5C freshness), other parameters).

In operation 13, the Remote UE processes the Direct Security Mode Command by verifying the MAC-PC5COMM using the generated K-PC5C key and the newly generated freshness parameter (Nonce-2). If this is successful, the Remote UE responds with a Direct Security Mode Complete message 414 and the Remote UE and UE-to-network relay may start to exchange secure user data using the K-PC5C key.

Figure 5A:
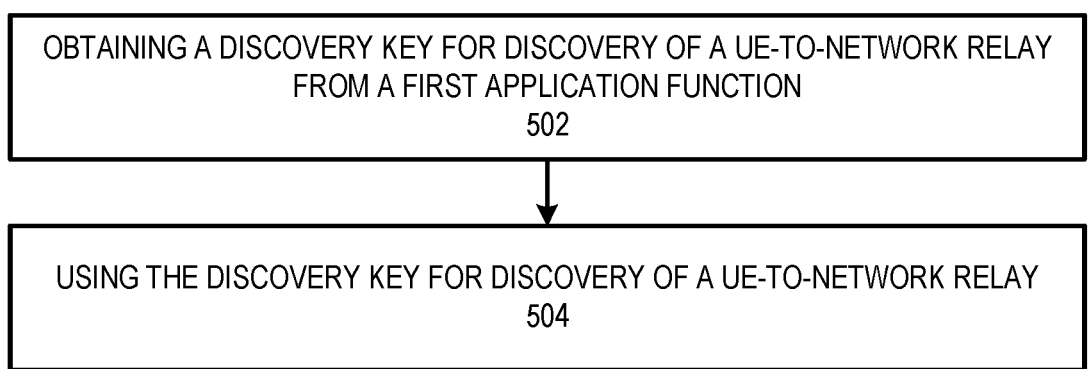

Operations according to some embodiments are illustrated in FIG. 5A. As shown therein, a method of operating a user equipment, UE, in a wireless communication system includes (502) obtaining a discovery key for discovery of a UE-to-Network relay from a first application function, and using (504) the discovery key for discovery of the UE-to-Network relay over a PC5 interface.

Obtaining the discovery key may include sending a key request to the first application function. The key request may include an identity of the UE, an identity of the UE-to-Network relay, a relay service code and/or a service identifier. The key request may further include an indication of the UE to act as a ProSe remote UE.

Figure 5B:
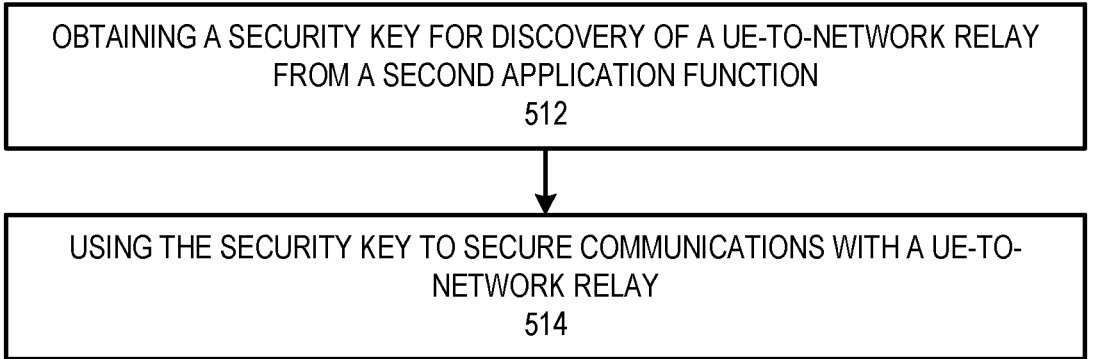

Operations according to further embodiments are illustrated in FIG. 5B. As shown therein, the method includes obtaining (512) a security key for securing communications with the UE-to-Network relay from a second application function, and using (514) the security key for securing communications with the UE-to-Network relay over a PC5 interface.

Obtaining the security key may include sending a second key request to the second application function. The second key request may include the identity of the UE, the identity of the UE-to-Network relay, the relay service code and/or the service identifier. The key request may include an indication of the UE to act as a ProSe remote UE.

The discovery key and/or the security key may be obtained via user plane communications in the wireless communication system.

Referring to FIG. 6A, the method may further include obtaining (602) an address of the first application function and/or the second application function from an access and mobility function in a core network of the wireless communication system.

Referring to FIG. 6B, the method may further include sending (612) a direct communication request to the UE-to-Network relay. The direct communication request may include the identity of the UE-to-Network relay, the relay service code, the service identifier, a temporary ID, and/or a PC5 communication key. The method may further include receiving (614) a direct security mode command from the UE-to-Network relay in response to the direct communication request, and, in response to the direct security mode command, generating (616) a PC5 communication key.

The direct security mode command may include a K-PC5C freshness parameter, and the PC5 communication key may be generated using the K-PC5C freshness parameter.

The PC5 communication key may be generated using the identity of the UE-to-Network relay, the relay service code, the service identifier, the temporary ID, and/or the PC5 communication key.

Figure 7:
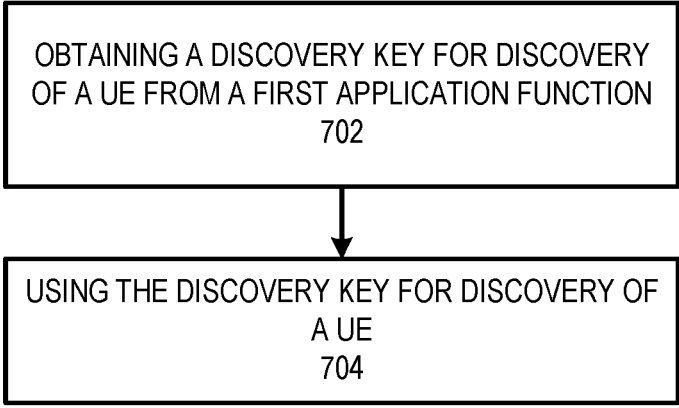

Referring to FIG. 7, a method of operating a user equipment-to-network, UE-to-NW, relay node in a wireless communication system includes obtaining (702) a discovery key for discovery of a remote UE from a first application function. The method may further include using the discovery key for discovery of the remote UE over a PC5 interface.

Obtaining the discovery key may include sending a first key request to a first application function. The first key request may include an identity of the UE-to-Network relay, a relay service code and/or a service identifier.

Figure 8:
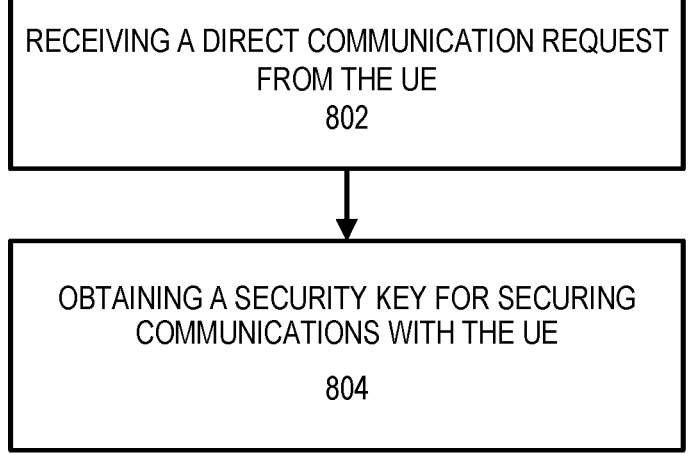

Referring to FIG. 8, the method may further include receiving (802) a direct communication request from the remote UE, and obtaining (804) a security key for securing communications with the remote UE. The security key may be used for securing communications with the remote UE over a PC5 interface.

The direct communication request may include the identity of the UE-to-Network relay, the relay service code, the service identifier, a temporary ID, and/or a PC5 communication key.

Obtaining the security key may include sending a second key request to a second application function.

The second key request may include the identity of the UE-to-Network relay, the relay service code and/or the service identifier.

The method may further include receiving a second key response from the second application function, and in response to the second key response, sending a direct security mode command to the remote UE. The direct security mode command may include a K-PC5C freshness parameter.

Obtaining the discovery key and/or the security key may be performed via user plane communications in the wireless communication system.

Figure 9:
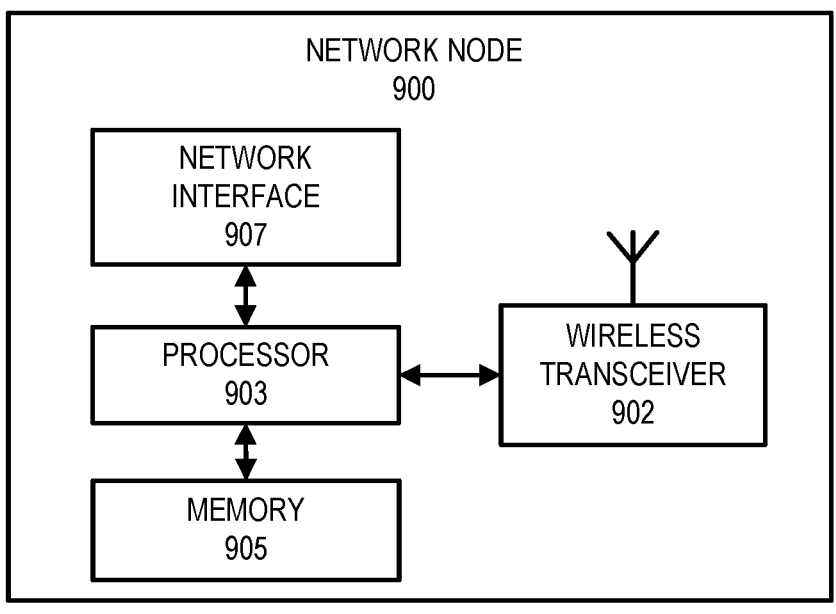
FIG. 9 is a block diagram illustrating a network node according to some embodiments of the inventive concepts.

FIG. 9 is a block diagram illustrating elements of a network node 900 of a communication system. The network node 900 may implement a RAN node and/or a CN node and/or a UE-to-Network Relay in the communication system. For example, the network node 900 may implement a gNodeB or eNodeB.

As shown, the network node may include a network interface circuit 907 (also referred to as a network interface) configured to provide communications with other nodes (e.g., with other base stations, RAN nodes and/or core network nodes) of the communication network. The network node 900 may also include a wireless transceiver circuit 902 for providing a wireless communication interface with UEs. The network node 900 may also include a processor circuit 903 (also referred to as a processor) coupled to the transceiver circuit 902 and the network interface 907, and a memory circuit 905 (also referred to as memory) coupled to the processor circuit. The memory circuit 905 may include computer readable program code that when executed by the processor circuit 903 causes the processor circuit to perform operations according to embodiments disclosed herein. According to other embodiments, processor circuit 903 may be defined to include memory so that a separate memory circuit is not required.

As discussed herein, operations of the network node may be performed by processor 903, the wireless transceiver circuit 902 and/or the network interface 907. For example, the processor 903 may control the network interface 907 to transmit communications through network interface 907 to one or more other network nodes and/or to receive communications through network interface from one or more other network nodes. Moreover, modules may be stored in memory 905, and these modules may provide instructions so that when instructions of a module are executed by processor 903, processor 903 performs respective operations (e.g., operations discussed herein with respect to Example Embodiments).

Figure 10:
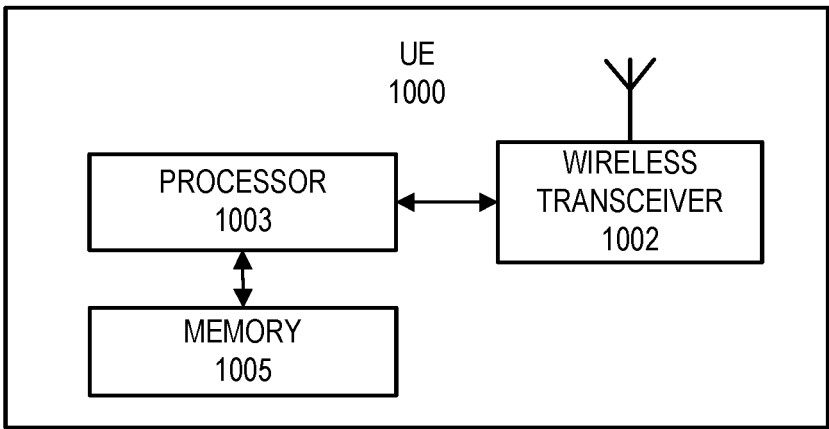
FIG. 10 is a block diagram illustrating a user equipment node according to some embodiments of the inventive concepts.

FIG. 10 is a block diagram illustrating elements of a UE 1000 of a communication system. As shown, the UE may include a wireless transceiver circuit 1002 for providing a wireless communication interface with a network. The UE 1000 may also include a processor circuit 1003 (also referred to as a processor) coupled to the transceiver circuit 1002 and the wireless transceiver circuit 1002, and a memory circuit 1005 (also referred to as memory) coupled to the processor circuit. The memory circuit 1005 may include computer readable program code that when executed by the processor circuit 1003 causes the processor circuit to perform operations according to embodiments disclosed herein. According to other embodiments, processor circuit 1003 may be defined to include memory so that a separate memory circuit is not required.

As discussed herein, operations of the UE may be performed by processor 1003 and/or the wireless transceiver circuit 1002. For example, the processor 1003 may control the wireless transceiver circuit 1002 to transmit communications to a network node 900. Moreover, modules may be stored in memory 1005, and these modules may provide instructions so that when instructions of a module are executed by processor 1003, processor 1003 performs respective operations (e.g., operations discussed herein with respect to Example Embodiments).

Explanations are provided below for abbreviations that are mentioned in the present disclosure.

| Abbreviation | Explanation |
|---|---|
| 5GC | 5G Core Network |
| 5GS | 5G System |
| AF | Application Function |
| AKA | Authentication and Key Agreement |
| AMF | Access and Mobility Function |
| BSF | Binding Support Function |
| CN | Core Network |
| D2D | Device to Device |
| DDNMF | Direct Discovery Name Management Function |
| DNN | Data Network Name |
| DPF | Direct Provisioning Function |
| EPC | Evolved Packet Core |
| EPS | Evolved Packet System |
| EUTRAN | Evolved Universal Terrestrial Radio Access Network |
| FQDN | Fully Qualified Domain Name |
| GBA | Generic Bootstrapping Architecture |
| GUTI | Globally Unique Temporary Identifier |
| ID | Identifier/Identity |
| IMSI | International Mobile Subscriber Identity |
| LTE | Long Term Evolution |
| ME | Mobile Equipment |
| MNO | Mobile Network Operator |
| NAF | Network Application Function |
| NEF | Network Exposure Function |
| NF | Network Function |
| NR | New Radio |
| NSSAI | Network Slice Selection Assistance Information |
| NW | Network |
| OTA | Over The Air |
| PCF | Policy and Charging Function |
| PKMF | ProSe Key Management Function |
| PLMN | Public Land Mobile Radio |
| PRUK | ProSe Relay User Key |
| PSK | Pre-Shared Key |

12

-continued

| Abbreviation | Explanation |
|---|---|
| RAN | Radio Access Network |
| SMF | Session Management Function |
| SUCI | Subscriber Concealed Identifier |
| SUPI | Subscriber Permanent Identifier |
| TCP | Transmission Control Protocol |
| TLS | Transport Layer Security |
| UDM | Unified Data Management |
| UE | User Equipment |
| UICC | Universal Integrated Circuit Card |
| UPF | User Plane Function |
| URSP | UE Route Selection Policy |
| USS | User Security Setting |

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
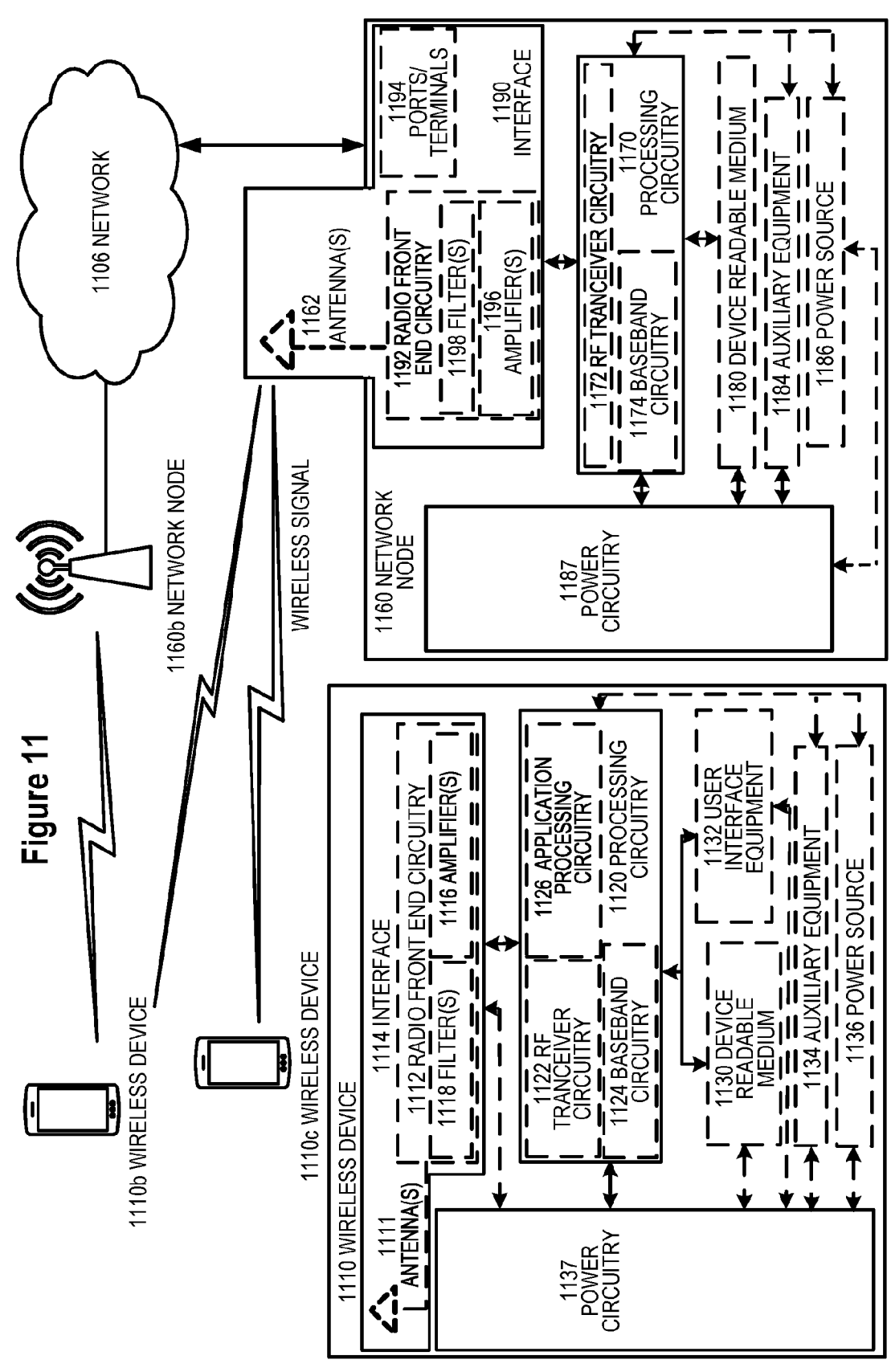
FIG. 11 is a block diagram of a wireless network in accordance with some embodiments.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160*b*, and WDs 1110, 1110*b*, and 1110*c* (also referred to as mobile terminals) In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192.

The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 11 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated. User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 12:
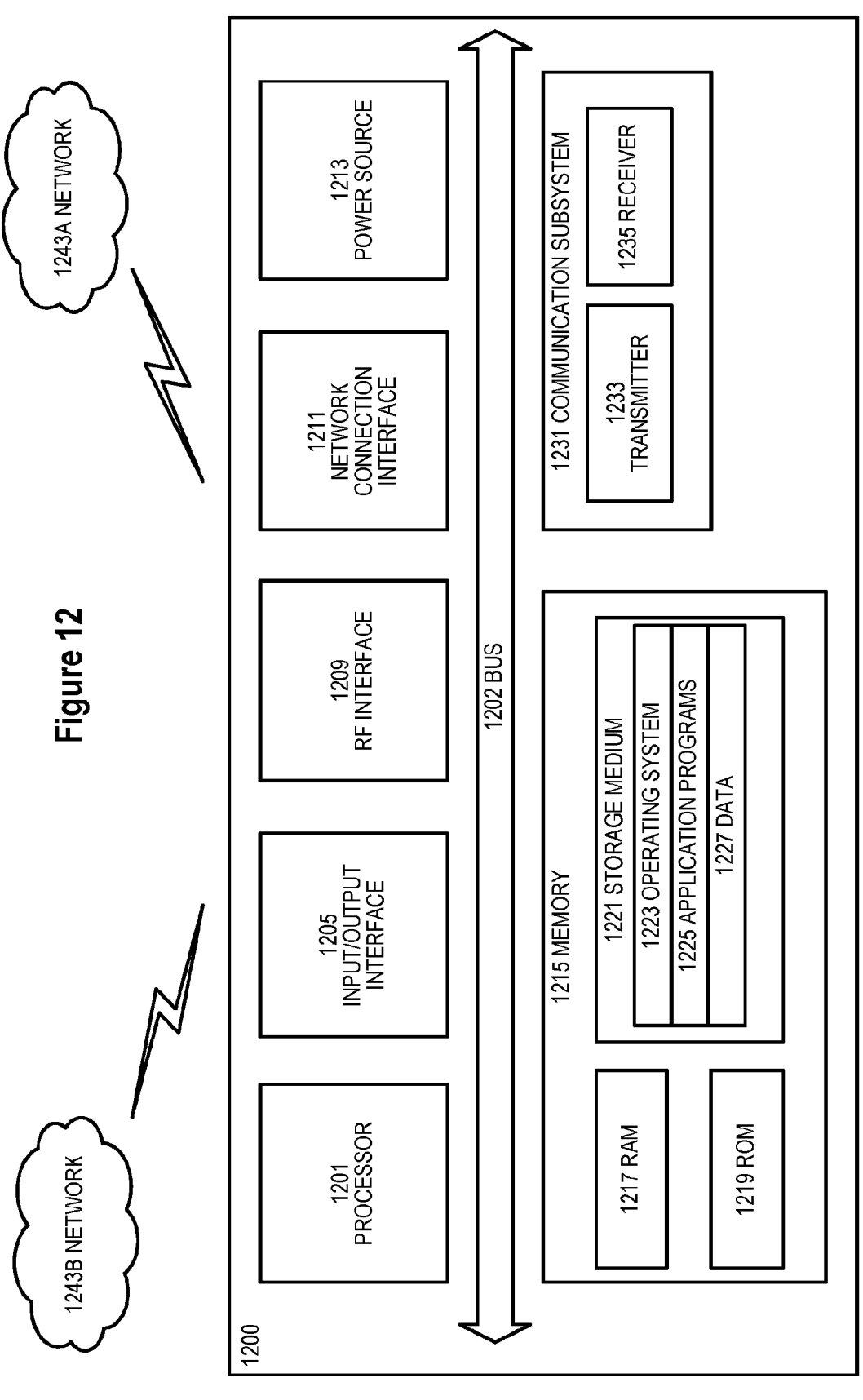
FIG. 12 is a block diagram of a user equipment in accordance with some embodiments.

FIG. 12: User Equipment in accordance with some embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 12, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

FIG. 13: Virtualization environment in accordance with some embodiments

FIG. 13 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 14:
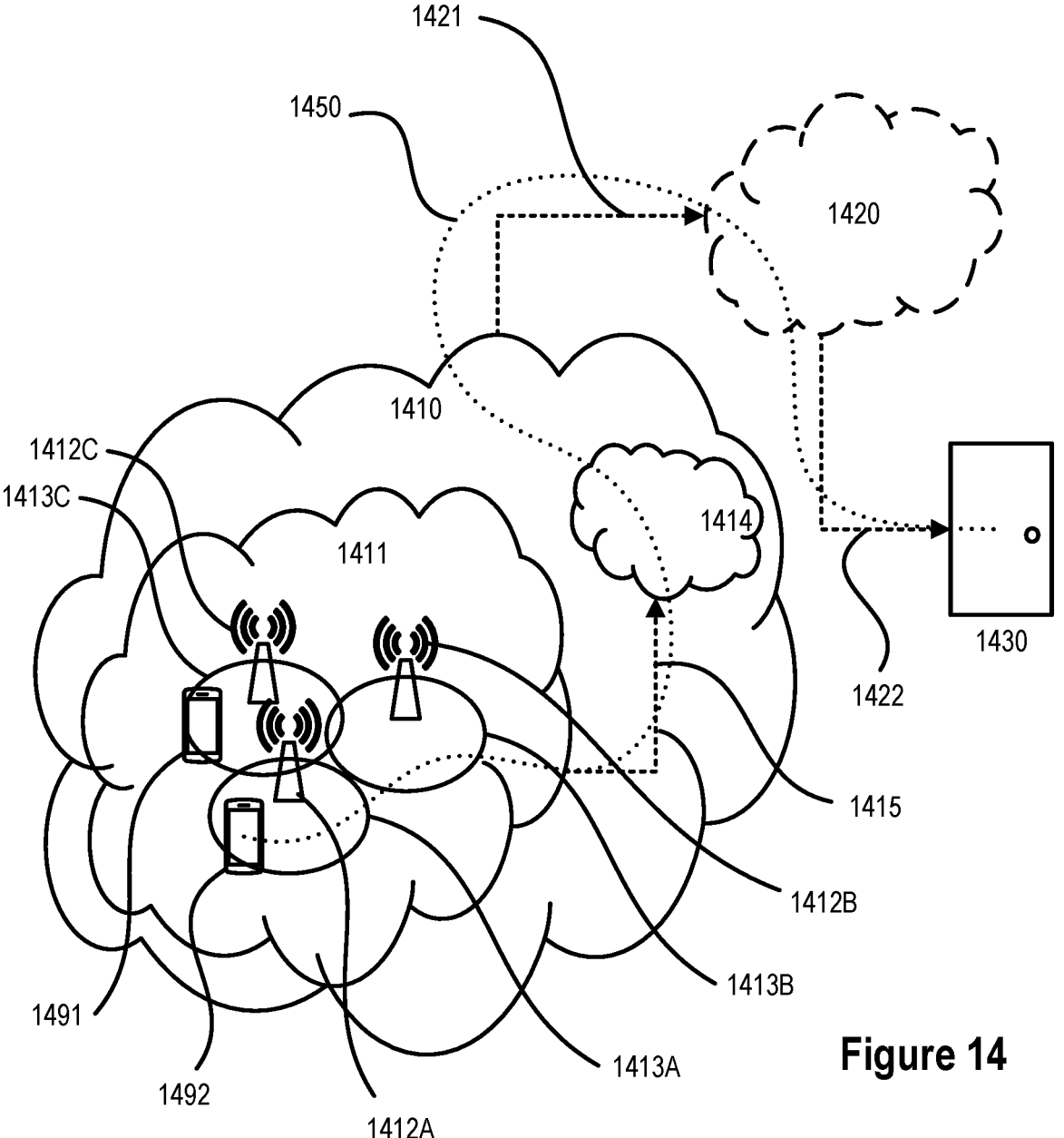
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 15:
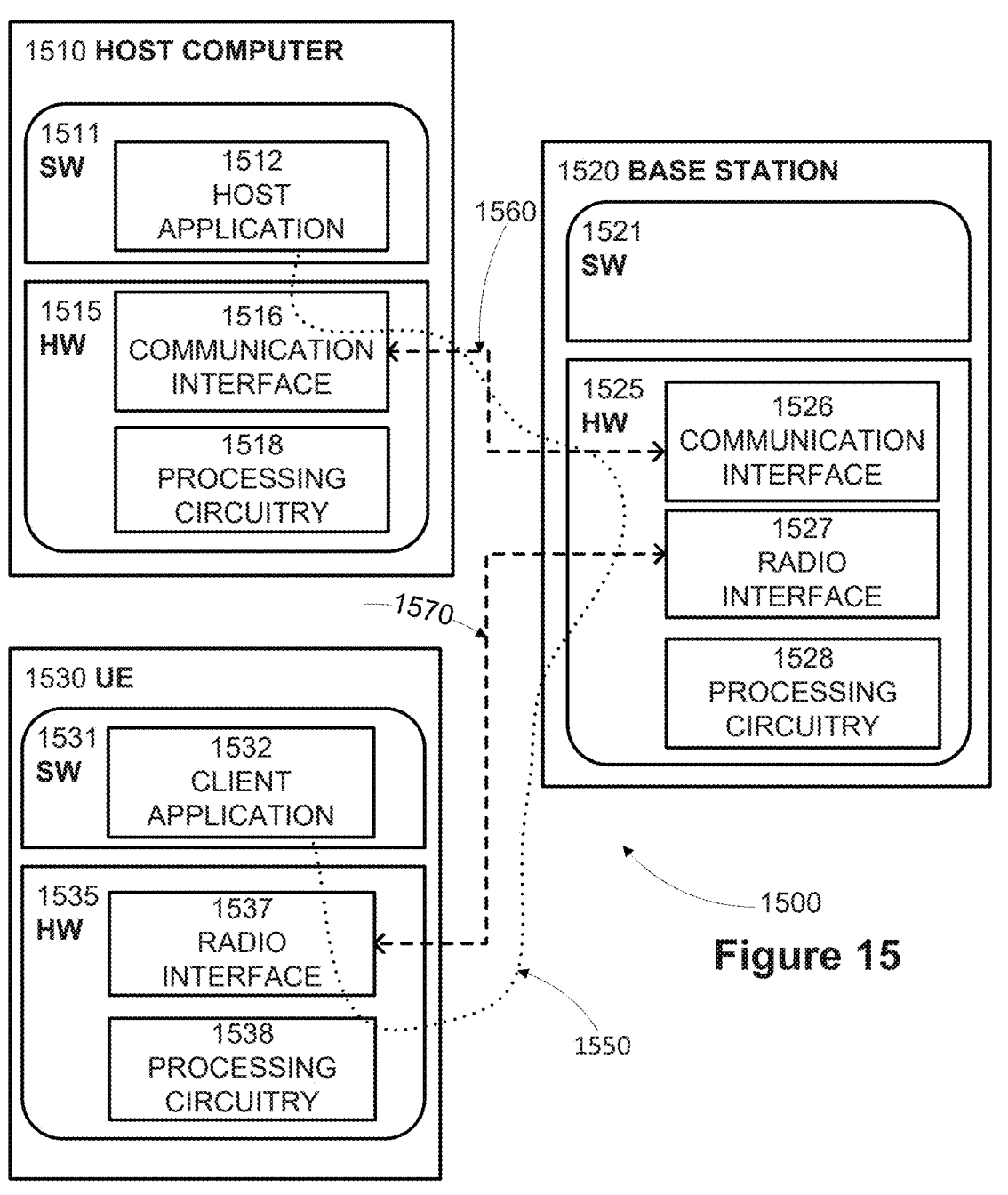
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments may improve the performance of OTT services provided to UE 1530 using OTT connection 1550, in which wireless connection 1570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figures 16, 17:
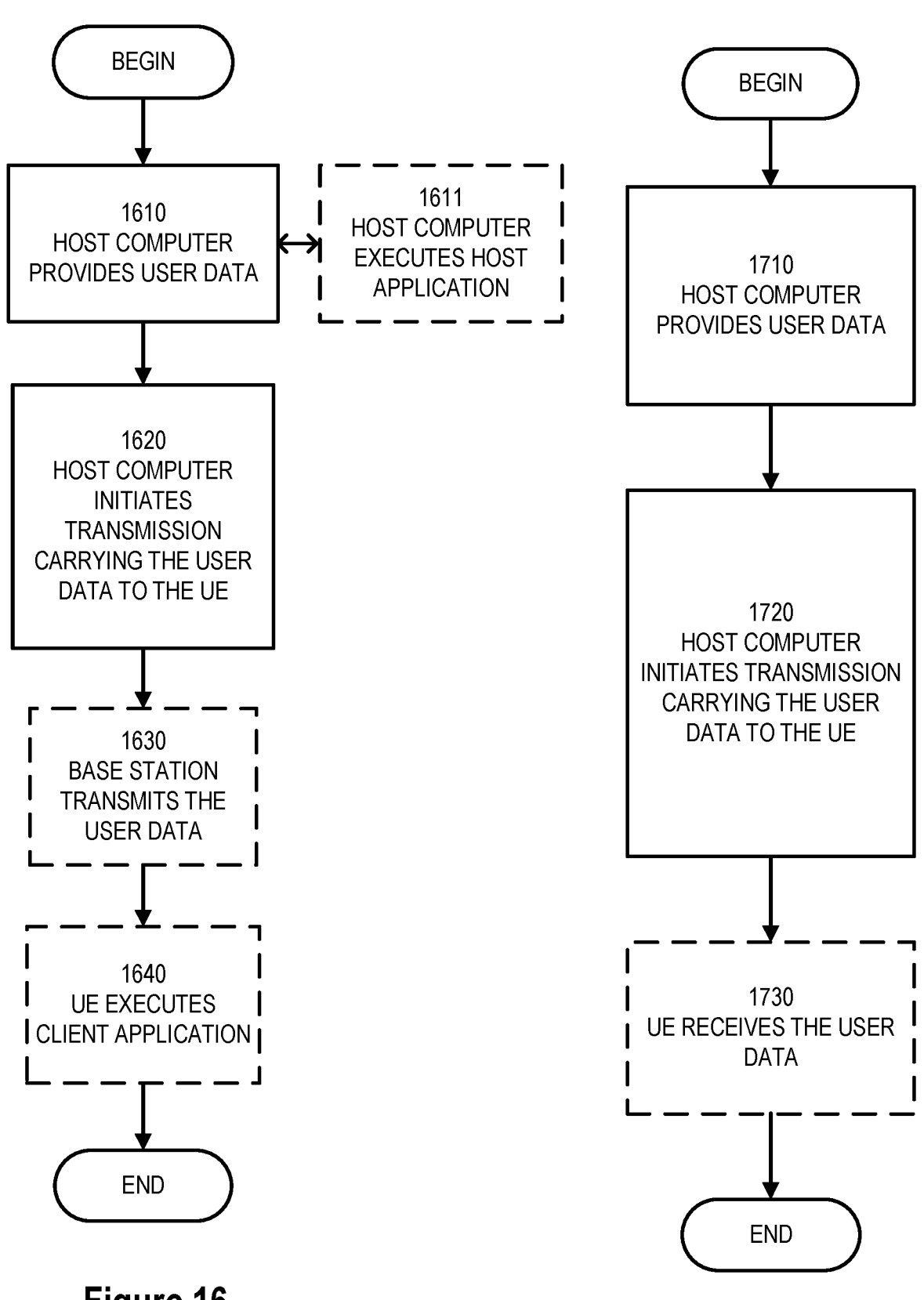
FIG. 16 is a block diagram of methods implemented in a communication system including a host computer, a base station, and a user equipment in accordance with some embodiments.
FIG. 17 is a block diagram of methods implemented in a communication system including a host computer, a base station, and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figures 18, 19:
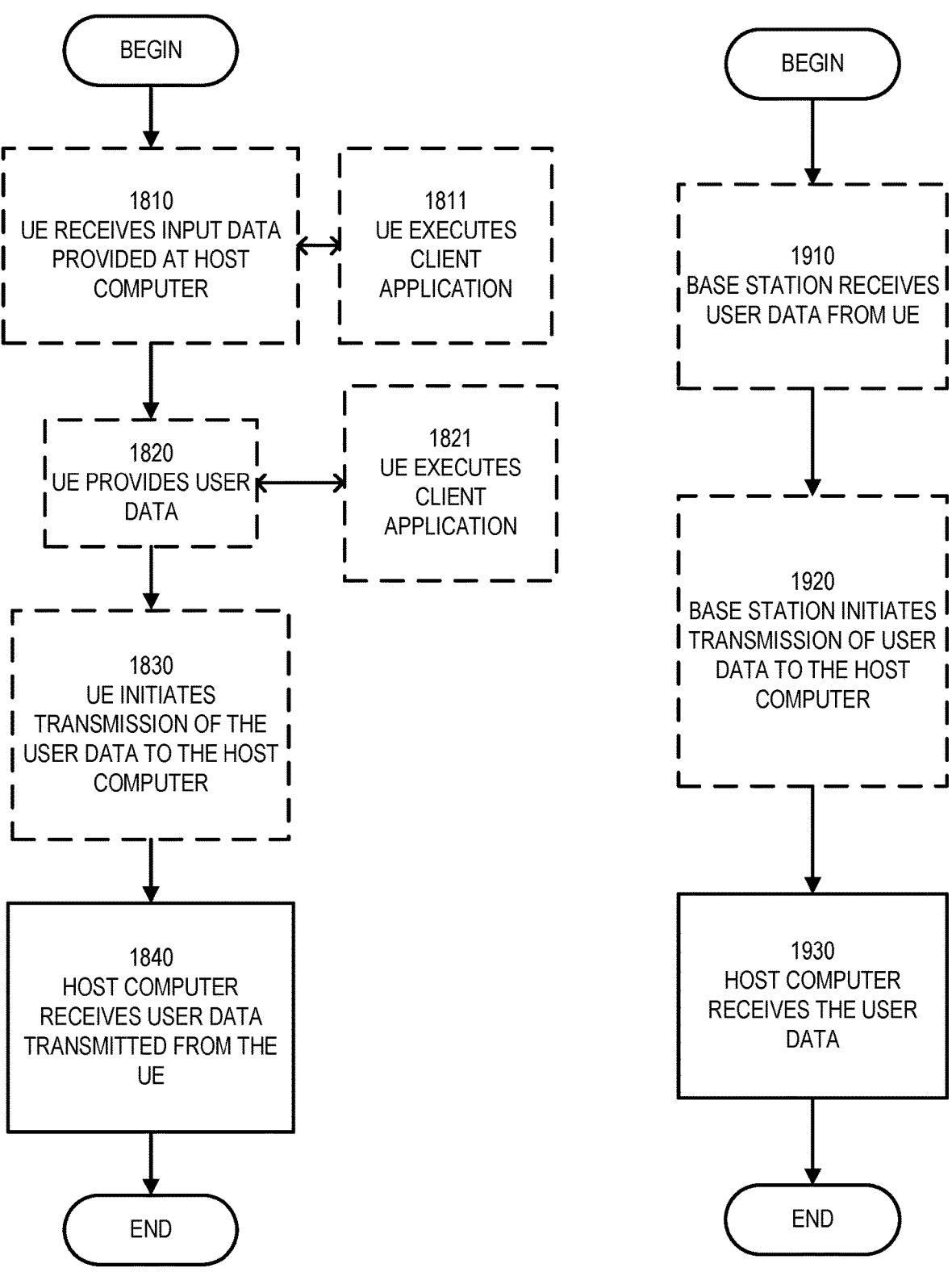
FIG. 18 is a block diagram of methods implemented in a communication system including a host computer, a base station, and a user equipment in accordance with some embodiments.
FIG. 19 is a block diagram of methods implemented in a communication system including a host computer, a base station, and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a remote user equipment (UE) in a wireless communication system, comprising:
    obtaining a discovery key for discovery of a UE-to-Network relay from a first application function, wherein obtaining the discovery key comprises sending a key request to the first application function, wherein the key request includes an identity of the UE, an identity of the UE-to-Network relay, a relay service code and/or a service identifier;
    obtaining an address of a second application function from an access and mobility function in a core network of the wireless communication system;
    obtaining a security key for securing communications with the UE-to-Network relay from the second application function;
    using the discovery key for discovery of the UE-to-Network relay over a PC5 interface; and
    using the security key to secure communications with the UE-to-Network relay over the PC5 interface.

2. The method of claim 1, wherein obtaining the discovery key and/or the security key is performed via user plane communications in the wireless communication system.

3. The method of claim 1, wherein the key request includes an indication of the UE to act as a ProSe remote UE.

4. The method of claim 1, wherein obtaining the security key comprises sending a second key request to the second application function.

5. The method of claim 4, wherein the second key request includes the identity of the UE, the identity of the UE-to-Network relay, the relay service code and/or the service identifier.

6. The method of claim 4, wherein the key request includes an indication of the UE to act as a ProSe remote UE.

7. The method of claim 1, further comprising:
    sending a direct communication request to the UE-to-Network relay.

8. The method of claim 7, wherein the direct communication request includes the identity of the UE-to-Network relay, the relay service code, the service identifier, a temporary ID, and/or a PC5 communication key.

9. The method of claim 7, further comprising:
    receiving a direct security mode command from the UE-to-Network relay in response to the direct communication request; and
    in response to the direct security mode command, generating a PC5 communication key.

10. The method of claim 9, wherein the direct security mode command includes a K-PC5C freshness parameter; and wherein the PC5 communication key is generated using the K-PC5C freshness parameter.

11. The method of claim 9, wherein the PC5 communication key is generated using the identity of the UE-to-Network relay, the relay service code, the service identifier, the temporary ID, and/or the PC5 communication key.

12. A method of operating a user equipment-to-network, UE-to-NW, relay node in a wireless communication system, comprising:

obtaining a discovery key for discovery of a user equipment, UE, from a first application function;

using the discovery key for discovery of the UE over a PC5 interface, wherein obtaining the discovery key comprises sending a first key request to the first application function, and wherein the first key request includes an identity of the UE-to-Network relay, a relay service code and/or a service identifier; and receiving a direct communication request from the UE, wherein the direct communication request includes the identity of the UE-to-Network relay, the relay service code, the service identifier, a temporary ID, and/or a PC5 communication key.

13. The method of claim 12, further comprising:

obtaining a security key for securing communications with the UE.

14. The method of claim 13, further comprising using the security key for securing communications with the UE over a PC5 interface.

15. The method of claim 13, wherein obtaining the security key comprises sending a second key request to a second application function.

16. The method of claim 15, wherein the second key request includes the identity of the UE-to-Network relay, the relay service code and/or the service identifier.

17. The method of claim 15, further comprising:

receiving a second key response from the second application function; and in response to the second key response, sending a direct security mode command to the UE.

18. The method of claim 17, wherein the direct security mode command includes a K-PC5C freshness parameter.

19. The method of claim 12, wherein obtaining the discovery key and/or the security key is performed via user plane communications in the wireless communication system.

20. A user equipment, UE, comprising:

processing circuitry and memory collectively configured to cause the UE to perform operations comprising:

obtaining a discovery key for discovery of a UE-to-Network relay from a first application function, wherein obtaining the discovery key comprises sending a key request to the first application function, wherein the key request includes an identity of the UE, an identity of the UE-to-Network relay, a relay service code and/or a service identifier;

obtaining an address of a second application function from an access and mobility function in a core network of a wireless communication system;

obtaining a security key for securing communications with the UE-to-Network relay from the second application function;

using the discovery key for discovery of the UE-to-Network relay over a PC5 interface; and using the security key for securing communications with the UE-to-Network relay over the PC5 interface.

21. The UE of claim 20, wherein obtaining the discovery key and/or the security key is performed via user plane communications in the wireless communication system.

22. The UE of claim 20, wherein the operations further comprise obtaining an address of the first application function and/or the second application function from an access and mobility function in a core network of the wireless communication system.

23. The UE of claim 20, wherein the key request includes an indication of the UE to act as a ProSe remote UE.

24. The UE of claim 20, wherein obtaining the security key comprises sending a second key request to the second application function.

25. The UE of claim 24, wherein the second key request includes the identity of the UE, the identity of the UE-to-Network relay, the relay service code and/or the service identifier.

26. The UE of claim 24, wherein the key request includes an indication of the UE to act as a ProSe remote UE.

27. The UE of claim 20, wherein the operations further comprise:

sending a direct communication request to the UE-to-Network relay.

28. The UE of claim 27, wherein the direct communication request includes the identity of the UE-to-Network relay, the relay service code, the service identifier, a temporary ID, and/or a PC5 communication key.

29. The UE of claim 27, wherein the operations further comprise:

receiving a direct security mode command from the UE-to-Network relay in response to the direct communication request; and in response to the direct security mode command, generating a PC5 communication key.

30. The UE of claim 29, wherein the direct security mode command includes a K-PC5C freshness parameter; and wherein the PC5 communication key is generated using the K-PC5C freshness parameter.

31. The UE of claim 29, wherein the PC5 communication key is generated using the identity of the UE-to-Network relay, the relay service code, the service identifier, the temporary ID, and/or the PC5 communication key.

32. A user equipment-to-network, UE-to-NW, relay node, comprising:

processing circuitry and memory collectively configured to cause the relay node to perform operations comprising:

obtaining a discovery key for discovery of a user equipment, UE, from a first application function;

using the discovery key for discovery of the UE over a PC5 interface, wherein obtaining the discovery key comprises sending a first key request to the first application function, and wherein the first key request includes an identity of the UE-to-Network relay, a relay service code and/or a service identifier; and receiving a direct communication request from the UE, wherein the direct communication request includes the identity of the UE-to-Network relay, the relay service code, the service identifier, a temporary ID, and/or a PC5 communication key.

33. The relay node of claim 32, wherein the operations further comprise:

obtaining a security key for securing communications with the UE.

34. The relay node of claim 33, further comprising using the security key for securing communications with the UE over a PC5 interface.

35. The relay node of claim 33, wherein obtaining the security key comprises sending a second key request to a second application function.

36. The relay node of claim 35, wherein the second key request includes the identity of the UE-to-Network relay, the relay service code and/or the service identifier.

37. The relay node of claim 35, wherein the operations further comprise:

receiving a second key response from the second application function; and in response to the second key response, sending a direct security mode command to the UE.

38. The relay node of claim 37, wherein the direct security mode command includes a K-PC5C freshness parameter.

39. The relay node of claim 32, wherein obtaining the discovery key and/or the security key is performed via user plane communications in a wireless communication system.

* * * * *